United States Patent [19]

Endo et al.

[11] 4,091,145

[45] May 23, 1978

[54] SUPPORT FOR ELECTROPHOTOGRAPHIC SENSITIVE PLATE

[75] Inventors: Katutoshi Endo; Makoto Ohira, both of Tokyo, Japan

[73] Assignee: Ricoh Co., Ltd., Tokyo, Japan

[21] Appl. No.: 650,465

[22] Filed: Jan. 19, 1976

[30] Foreign Application Priority Data

Jan. 23, 1975 Japan .................................... 50-9961

[51] Int. Cl.$^2$ ......................... B32B 5/16; B32B 15/04

[52] U.S. Cl. .................................... 428/546; 427/199; 427/289; 428/172; 428/195; 428/323; 428/328; 428/329; 428/332; 428/469; 96/1 R

[58] Field of Search ............... 428/323, 329, 469, 471, 428/206, 209, 402, 546, 614, 551; 427/71, 83, 198, 199, 125, 180, 190, 203, 205, 289, 290; 96/1 R; 29/569 R, 572, 576 R, 192 R

[56] References Cited

U.S. PATENT DOCUMENTS

| | | | |
|---|---|---|---|
| 1,574,890 | 3/1926 | Hofmann | 427/198 |
| 2,618,572 | 11/1952 | Parrish | 427/198 |
| 3,394,066 | 7/1968 | Miles | 204/164 |
| 3,480,460 | 11/1969 | Breton et al. | 427/198 |
| 3,505,101 | 4/1970 | Koffskey, Jr. et al. | 428/469 |
| 3,591,350 | 7/1971 | Stareck et al. | 427/203 |
| 3,634,135 | 1/1972 | Akiyama et al. | 428/323 |
| 3,944,418 | 3/1976 | Sloan | 96/1 R |

FOREIGN PATENT DOCUMENTS

| | | |
|---|---|---|
| 5,779 | 1971 | Japan. |

*Primary Examiner*—George F. Lesmes
*Assistant Examiner*—P. Thibodeau
*Attorney, Agent, or Firm*—Blanchard, Flynn, Thiel, Boutell & Tanis

[57] ABSTRACT

A support for use in electrophotographic sensitive plates which is superior in durability as well as half-tone reproducibility as photosensitive material and is prepared by forming a barrier layer on practically the whole surface of a conductive base plate by burying fine particles of metal oxide therein.

6 Claims, No Drawings

SUPPORT FOR ELECTROPHOTOGRAPHIC SENSITIVE PLATE

BACKGROUND OF THE INVENTION (a) Field of the Invention

The present invention relates to a support for use in electrophotographic sensitive plate, and particularly relates to a support which renders a sensitive plates superior in durability as well as half-tone reproducibility.

(b) Description of the Prior Art

Conventional sensitive plates for use in electrophotography have been prepared by forming a photosensitive layer of selenium deposited through vacuum evaporation on the surface of a conductive support, and as the material for said conductive support, such metals as aluminum, nickel and brass have been popular.

Besides, as a method of minimizing leakage of the electrical charge on the photosensitive layer while the photosensitive layer is not being subjected to radiation with active radiant rays, or reducing dark-decay, there has been proposed the provision of a barrier layer consisting of metal oxide between said conductive support and the photosensitive layer. Provision of this barrier layer is performed through the process comprising dipping a metal plate such as an aluminum plate in an alkaline or acid solution thereby to effect etching and cleaning of the surface of said metal plate, drying thereafter, and placing in a furnace having a temperature of 200° C or more for more than 30 minutes thereby to oxidize the surface of the metal plate.

Also, there has been known a method of forming a barrier layer on the surface of a metal plate by applying glow discharge thereto (See Japanese Patent Open No. 5779/1971).

However, the former of the foregoing two methods is defective in that, inasmuch as the inside of the high-temperature furnace is under atmospheric conditions, there is a fear of impurities becoming attached to the surface of the metal plate or being generated at this stage of processing. Besides, according to this method, it is difficult to control the thickness of the barrier layer, so that when a sensitive plate is prepared by employing the resulting support, the residual electric potential becomes too much or the light-fatigue is apt to take place. Moreover, because of the treatment at a high temperature, the metal plate (including cylindrically shaped ones such as a metal drum) is apt to become deformed. While, in the case of the latter method, it not only requires expensive manufacturing equipment but also is unsuitable for mass production.

SUMMARY OF THE INVENTION

The present invention not only renders it possible to form a barrier layer by an inexpensive and simple means, but also provides a support which manifests a superior durability as well as half-tone reproducibility when employed as an electrophotographic sensitive plate upon providing a photosensitive layer thereon, compared with sensitive plates prepared according to the foregoing conventional methods.

The object of the present invention is to provide a support for use in electrophotographic sensitive plates which comprises a barrier layer formed by burying fine particles of metal oxide on practically the whole surface of a conductive base plate.

As the metal oxide to be buried as above in the present invention, there are aluminum oxide, titanium oxide, chromium oxide, zirconium oxide, silicon oxide, zinc oxide, iron oxide, magnesium oxide, etc. The particle diameter of these metal oxides is preferably in the range of from 100 to 8000 mesh or thereabouts. Provision of a barrier layer by burying fine particles of such a metal oxide as above in the surface of the base plate is effected through the process of grinding the surface of base plate with, for instance, a grindstone consisting essentially of metal oxide (e.g., grinding process or superfinishing process). As alternates to the foregoing processes of burying fine particles of metal oxide, there are the honing process wherein metal oxide powder is to be jetted together with water or grease onto the surface of base plate by applying a high pressure, the sandblasting process wherein metal oxide powder is to be sprayed on the surface of base plate by means of compressed air, and the buffing process wherein the surface of base plate is to be ground with a resilient buffing wheel consisting of cloth or felt and carrying metal oxide. All of these alternative processes are effective alike in burying metal oxide powder in the surface of base plate to form a barrier layer. In this context, as the conductive base plate, the aforesaid metal plate (or metal drum) is suitable.

When an electrophotographic sensitive material is prepared by forming a known photoconductive layer on a support obtained by thus burying fine particles of metal oxide in the surface of base plate and electricity is charged on said sensitive material, injection of electric charge from the support to the photoconductive layer is impeded, resulting in the lowering of the velocity of dark-decay.

A further significant effect achieved by the support according to the present invention is that, inasmuch as the whole surface of the support is microscopically not uniformly covered with the metal oxide buried therein and is dotted with uncovered portions of the base plate, when the present support is employed for a sensitive plate, said sensitive plate comes to be disorderly dotted with portions wherein the velocity of dark-decay is relatively low and portions wherein said velocity is relatively high, entailing difference in electric potential of these portions and consequently a remarkable improvement of the half-tone reproducibility of the sensitive plate. In this connection, in the case of preparing an electrophotographic sensitive material by employing the present support, any of the known inorganic as well as organic photoconductive layers is applicable, and a resinous protective film can be further provided thereon. In case metal oxide is buried irregularly or in an aggregated manner it is liable to cause unevenness in the copied image density. Due to this, it is preferable to treat the support of the present invention with ultrasonic wave in an organic solvent (TRICLENE, PERCLENE, etc.) previously before the photoconductor layer is formed by depositing through vacuum evaporation and thus make burying of the metal oxide more uniform.

DESCRIPTION OF THE PREFERRED EMBODIMENTS

EXAMPLE 1

A flat aluminum plate was dipped in a 5% aqueous solution of caustic soda having a temperature of 40° C for 30 seconds, washed in water subsequent thereto, then dipped in a 3% aqueous solution of nitric acid for 20 seconds, washed in water again, and dried thereafter.

Subsequently, the thus treated aluminum plate was subjected to buffing by means of an open bias sisal buff with an emulsion-type abrasive comprising kilned alumina attached thereto, whereby fine particles of aluminum oxide were buried in the surface of said aluminum plate.

Next, after degreasing from the plate, by providing a 50μ-thick photosensitive layer consisting of amorphous selenium thereon, an electrophotographic sensitive plate was prepared.

When a surface potential of +600 V was charged on this sensitive plate by corona discharge, light of a tungsten lamp was then applied to the plate through Gray Scale manufactured by Kodak Co., development was effected thereafter by means of a liquid developer, and transfer to an ordinary paper was performed, the resulting tone was confirmed to be grade-6.

Meanwhile, in the case of a comparative photosensitive material prepared in the same way as above save for omission of the buffing process, the tone was grade-6.

EXAMPLE 2

By applying the same procedures as in Example 1 save for replacing aluminum oxide with chromium oxide, an electrophotographic sensitive material was prepared. In the case of this photosensitive material, the tone was confirmed to be grade-9.

EXAMPLE 3

By applying the same procedures as in Example 1 save for employing brass as the conductive base plate and ferric oxide as the abrasive, an electrophotographic sensitive material was prepared. In the case of this photosensitive material, the tone was grade-9. Meanwhile, in the case a comparative photosensitive material prepared in the same way as above save for omission of the buffing process, the tone was grade-5.

EXAMPLE 4

By treating a flat brass plate with 3000-mesh aluminum oxide through liquid-honing process (hydraulic pressure: 10 Kg/cm$^2$; 5 minutes), a support was prepared. Subsequently, a 50μ-thick layer of amorphous selenium was formed on this support by depositing through vacuum evaporation, whereby a photosensitive material was prepared. In the case of this photosensitive material, the tone was grade-9.

EXAMPLE 5

After subjecting the surface of a flat aluminum plate to superfinishing process by means of a grindstone consisting essentially of aluminum oxide, a 50μ-thick layer of amorphous selenium was formed thereon by depositing through vacuum evaporation, whereby a photosensitive material was prepared. In the case of this photosensitive material, the tone was grade-9.

EXAMPLE 6

A support was prepared by jetting onto a flat aluminum plate titanium oxide having a particle diameter of 6,000 meshes for 10 minutes by means of compressed air (20 Kg/cm$^2$). Subsequently, a 70μ-thick layer of amorphous selenium was formed on this support by depositing through vacuum evaporation, whereby a photosensitive material was prepared. In the case of this photosensitive material, the tone was grade-9.

EXAMPLE 7

The same procedure as in Example 6 was carried out excepting the use of chromium oxide in place of titanium oxide to thereby successfully obtain a sensitive plate superior in the tone.

What is claimed is:

1. A support for electrophotographic sensitive plate consisting of a metal substrate having directly embedded in its surface fine metal oxide particles having a particle diameter in the range of from 100 to 8000 mesh, said metal oxide being a member selected from the group consisting of oxides of aluminum, titanium, chromium, zirconium, silicon, zinc, iron and magnesium, said particles forming a barrier layer consisting essentially of said particles firmly embedded in and attached to said surface of said substrate and distributed substantially uniformly over substantially the entire surface area thereof, said barrier layer being discontinuous and being dotted by microscopic uncovered portions of said surface of said metal substrate.

2. A support according to claim 1, wherein said metal substrate consists of a metal plate or a metal drum.

3. A support according to claim 1, wherein said barrier layer has been formed by grinding said surface of said substrate with a grinding stone consisting essentially of said fine metal oxide particles.

4. A support according to claim 1, wherein said barrier layer has been formed by jetting a mixture of said fine metal oxide particles with water or grease, under a high pressure, against said surface of said substrate.

5. A support according to claim 1, wherein said barrier layer has been formed by spraying a mixture of said fine metal oxide particles and compressed air against said surface of said substrate.

6. A support according to claim 1, wherein said barrier layer has been formed by grinding said surface of said substrate with a resilient buffing wheel having said fine metal oxide particles attached thereto.

* * * * *